United States Patent
Sureka et al.

(10) Patent No.: US 8,752,001 B2
(45) Date of Patent: Jun. 10, 2014

(54) SYSTEM AND METHOD FOR DEVELOPING A RULE-BASED NAMED ENTITY EXTRACTION

(75) Inventors: Ashish Sureka, New Delhi (IN); Pranav Prabhakar Mirajkar, Nasik (IN); Kishore Varma Indukuri, Tanuku Taluku (IN)

(73) Assignee: Infosys Limited (IN)

( * ) Notice: Subject to any disclaimer, the term of this patent is extended or adjusted under 35 U.S.C. 154(b) by 998 days.

(21) Appl. No.: 12/784,780

(22) Filed: May 21, 2010

(65) Prior Publication Data

US 2011/0010685 A1 Jan. 13, 2011

(30) Foreign Application Priority Data

Jul. 8, 2009 (IN) .......................... 1614/CHE/2009

(51) Int. Cl.
*G06F 9/44* (2006.01)
*G06F 9/455* (2006.01)

(52) U.S. Cl.
USPC ............................................ 717/102; 717/126

(58) Field of Classification Search
None
See application file for complete search history.

(56) References Cited

U.S. PATENT DOCUMENTS 7,596,778 B2 * 9/2009 Kolawa et al. ................ 717/126

* cited by examiner

*Primary Examiner* — Hyun Nam
(74) *Attorney, Agent, or Firm* — Cantor Colburn LLP

(57) ABSTRACT

A system and method for developing a rule-based named entity extraction system is provided. The method includes analyzing requirements of business users. The method further includes designing the rule-based named entity extraction system based on the requirement analysis. Further, the method includes implementing the design of rule-based named entity extraction system using one or more GUI-based tools. Thereafter, regression testing of the rule-based named entity extraction system is conducted. Finally, rule-based named entity extraction system is deployed.

16 Claims, 14 Drawing Sheets

Overall Accuracy Report (Summary) — 1002

| Color Coding | Label | Percentage | Number |
|---|---|---|---|
| ▨ | Passed | 75% | 150 |
|   | Partially Correct | 15% | 030 |
| ■ | Failed | 10% | 020 |

Overall Accuracy Report

Entity-Level Accuracy Report — 1004

Accuracy Report (PART)

| Color Coding | Label | Percentage | Number |
|---|---|---|---|
| ▨ | Passed | 95% | 095 |
| ■ | Failed | 05% | 005 |

PART

Accuracy Report (DEFECT)

| Color Coding | Label | Percentage | Number |
|---|---|---|---|
| ▨ | Passed | 50% | 025 |
| ■ | Failed | 50% | 025 |

DEFECT

| Rule ID | Rule Name | Input Parameters |
|---|---|---|
| 001 | Phrase/Word Match | 1. Word/Phrase or Lexicon |
| 002 | Trigger Word +/- N | 1. Trigger word<br>2. Number of words to capture after trigger word<br>3. Number of words to capture before trigger word |
| 003 | Trigger Word +/- Lexicon Delimiter | 1. Trigger word<br>2. Left delimiter (lexicon or word/phrase)<br>3. Right delimiter (lexicon or word/phrase) |

FIG. 13

SYSTEM AND METHOD FOR DEVELOPING A RULE-BASED NAMED ENTITY EXTRACTION

FIELD OF INVENTION

The present invention is directed towards developing a rule-based named entity extraction system. More particularly, the present invention provides a system and method for providing a Rapid Application Development (RAD) framework for developing a rule-based named entity extraction system.

BACKGROUND OF THE INVENTION

Rule-based named entity extraction is a natural language processing technique that identifies one or more named entities present in unstructured text data based on one or more predefined rules. Examples of named entities include, but are not limited to, person names, products, organizations, locations, email addresses, vehicles, computer parts, currencies, temporal entities such as dates, times, days, years, months and weeks, and numerical entities such as measurements, percentages and monetary values. Rules are regular expressions formulated by domain experts based on writing style and terminologies of target domain of unstructured text data.

While developing a rule-based named entity extraction system, the rules defined by domain experts are implemented in a high level programming language such as Java, C++, FORTRAN, and PASCAL etc. by users who possess software coding skills. The users who have software coding skills are hereinafter referred to as specialists. The domain technology experts may not possess software coding skills and may require technical specialists at the time of implementation of the rules. The dependency of domain experts on technology specialists increases the cost of development of a rule-based named-entity extraction system due to involvement of extra resources/manpower. Further, the development time of the extraction system increases due to additional communication required between domain and technical specialist. Furthermore, the technology specialists need to make changes at source code level of the rule-based named entity extraction system whenever the rules have to be modified/updated. The process of making changes at source code level for modifying rules is arduous and time consuming. As a result, the productivity and efficiency of technical specialists is decreased. Also, the cost and efforts involved in procuring such resources for different environment makes the entire process arduous and infeasible.

Further, regression testing is an essential aspect of developing a rule-based named entity extraction system and is conducted to verify source code of the rule-based named entity extraction system whenever the source code is modified. Presently, regression testing is conducted by either a customized external regression testing tool or by adding a custom regression testing code to the source code of the extraction system. However, conducting regression testing through testing code and external regression testing tool is arduous, time consuming and requires involvement of technical specialists.

In light of the above-mentioned disadvantages, there is a need for advanced rule modeling and regression testing tools that facilitate quick and easy development of a rule-based named entity extraction system. The rule modeling and regression testing tools should facilitate domain experts who do not possess requisite software coding skills to develop a rule-based named entity extraction system. Further, the rule modeling and regression testing tools should enhance the productivity/efficiency of the technical specialists.

SUMMARY OF THE INVENTION

A method and system for developing a rule-based named entity extraction system is provided. In an embodiment of the present invention, the named entity extraction system is developed for extracting named entities from unstructured text data.

In various embodiments of the present invention, the system for developing a rule-based named entity extraction system includes a RAD framework. The RAD framework includes a heuristics modeler, which is a GUI-based tool configured to facilitate building of rules and lexicons for named entity extraction. Further, the RAD framework includes a project settings module, which is a GUI-based tool configured to enable application developers to perform project management activities related to implementing the rule-based named entity extraction system. Furthermore, the RAD framework includes a testing framework, which is a GUI-based tool configured to facilitate automated regression testing of the rule-based named entity extraction system. Additionally, the RAD framework includes a deployment module configured to facilitate deployment of the rule based named entity extraction system using software components.

In various embodiments of the present invention, the method for developing a rule-based named entity extraction system includes analyzing requirements of business users wherein requirements analysis comprises understanding a business problem and studying domain specific language patterns. Further, the method includes designing the rule-based named entity extraction system based on the requirement analysis. Furthermore, the method includes implementing the design of rule-based named entity extraction system using one or more GUI-based tools. Additionally, the method includes conducting regression testing of the rule-based named entity extraction system and deploying the rule-based named entity extraction system.

BRIEF DESCRIPTION OF THE ACCOMPANYING DRAWINGS

The present invention is described by way of embodiments illustrated in the accompanying drawings wherein:

FIG. 10 is a sample accuracy report illustrating regression testing results of a rule-based named entity extraction system;

FIG. 13 illustrates a rules browser Graphical User Interface (GUI) screen; and

DETAILED DESCRIPTION OF THE INVENTION

A system and method for developing a rule-based named entity extraction system are described herein. The present invention provides a means for building rules and lexicons of a rule-based named entity extraction system using one or more GUI-based tools of a Rapid Application Development (RAD) framework. The present invention also provides a means for creating and executing one or more test cases for conducting regression testing of the rule-based named entity extraction system. The present invention further provides a means for deploying the rule-based named entity extraction system when the regression testing is complete.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For the purpose of clarity, details relating to technical material that are known in the technical fields related to the invention have not been described in detail so as not to unnecessarily obscure the present invention.

The present invention would now be discussed in context of embodiments as illustrated in the accompanying drawings.

Figure 1:
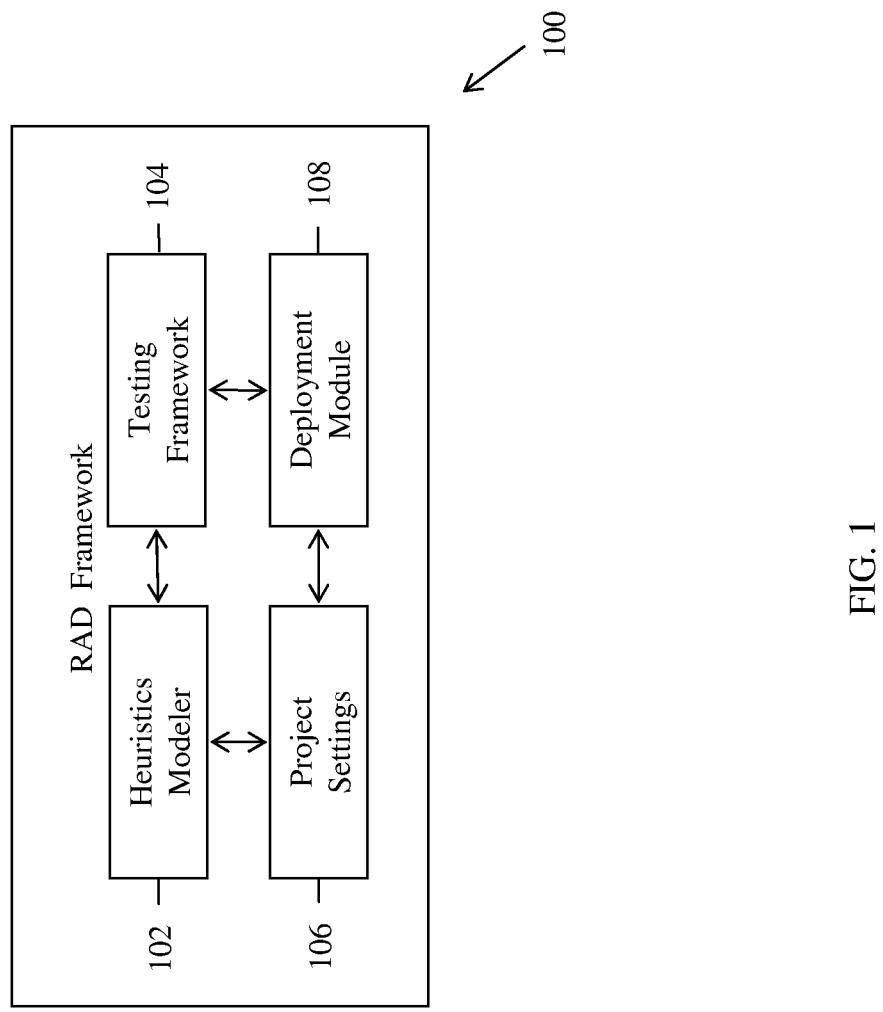
FIG. 1 illustrates a block diagram of a Rapid Application Development (RAD) framework for developing a rule-based named entity extraction system.

FIG. 1 illustrates a block diagram of a Rapid Application Development (RAD) framework 100 for developing a rule-based named entity extraction system. RAD framework 100 comprises a heuristics modeler 102, a testing framework 104, a project settings module 106, and a deployment module 108.

RAD framework 100 is a Graphical User Interface (GUI) based application development environment that facilitates quick development of a rule-based named entity extraction system. A rule-based named entity extraction system is a software application which can extract one or more named entities from unstructured text data based on one or more predefined rules. Rules are text-parsing heuristics/regular expressions formulated by domain experts/business analysts based on domain specific writing style and terminologies. The rules defined by domain experts/business analysts are implemented in a high level programming language such as Java, C++, FORTRAN, Pascal etc. for developing a rule-based named entity extraction system. In an embodiment of the present invention, user who develops a rule-based named entity extraction system may be referred to as an application developer. In various embodiments of the present invention, an application developer may be a business user, a business analyst, a domain expert, or a technical programmer.

RAD framework 100 facilitates application developers to quickly develop a rule-based named entity extraction system using one or more GUI-based tools. In an embodiment of the present invention, RAD framework 100 eliminates writing of an application code for developing a rule-based named entity extraction system. In another embodiment of the present invention, RAD framework 100 facilitates automatic generation of application code corresponding to rules defined using GUI based tools. In yet another embodiment of the present invention, an Extensible Markup Language (XML) file may be automatically generated that defines one or more rules in a declarative fashion. In yet another embodiment of the present invention, the application code and XML file corresponding to rules may be stored in a source code repository and may be accessed by source code of named-entity extraction system at run-time. In yet another embodiment of the present invention, the source code repository may be present in a file system or Relational Database Management System (RDBMS) of RAD framework 100.

Heuristics modeler 102 is a GUI-based modeling tool that facilitates application developers to build one or more linguistic rules and lexicons. In various embodiments of the present invention, heuristic modeler 102 is a wizard that guides an application developer in building and maintaining rules and lexicons.

Testing framework 104 is an integrated GUI-based testing framework that facilitates automated regression testing of a rule-based named entity extraction system. Regression testing is an essential aspect of developing a rule-based named entity extraction system and is conducted to verify source code of the named entity extraction system whenever the source code is modified. In an embodiment of the present invention, regression testing is referred to as verification testing and is conducted to assess accuracy of a rule-based named entity extraction system when its rules and lexicons are modified. In another embodiment of the present invention, regression testing is conducted by comparing previous and current test results of a rule-based named entity extraction system.

Project settings module 106 is a GUI-based tool that facilitates application developers to perform basic project management activities. The basic project management activities may include, but are not limited to, entity specification, input data specification, rules browsing, lexicon browsing, and specifying project settings, project name, and working directory.

Deployment module 108 is a GUI based module that facilitates deployment of rule-based named entity extraction system using various software components such as run time executables, Application Programming Interface (API) documentation, user guides, help files, and release notes.

Operationally, heuristics modeler 102 facilitates an application developer to build one or more rules for developing a rule-based named entity extraction system. The rule-based named entity extraction system developed using heuristics modeler 102 is tested using testing framework 104. In various embodiments of the present invention, project settings module 106 facilitates development and regression testing of an entity extraction system by providing user interfaces and back-end engines to specify entities, input text data, project settings, project name, and working directory. Deployment module 108 facilitates deployment of the rule-based named entity extraction system when its testing is complete.

In an embodiment of the present invention, RAD framework 100 facilitates development of a rule-based named entity extraction system by application developers who do not possess software coding skills. In another embodiment of the present invention, RAD framework 100 enhances the productivity/efficiency of application developers who possess software coding skills for developing a rule-based named entity extraction system. In yet another embodiment of the present invention, RAD framework 100 facilitates application developers to easily manage/update rules, heuristics, and lexicons and accelerates the development to deployment time of a rule-based named entity extraction system.

Figure 2:
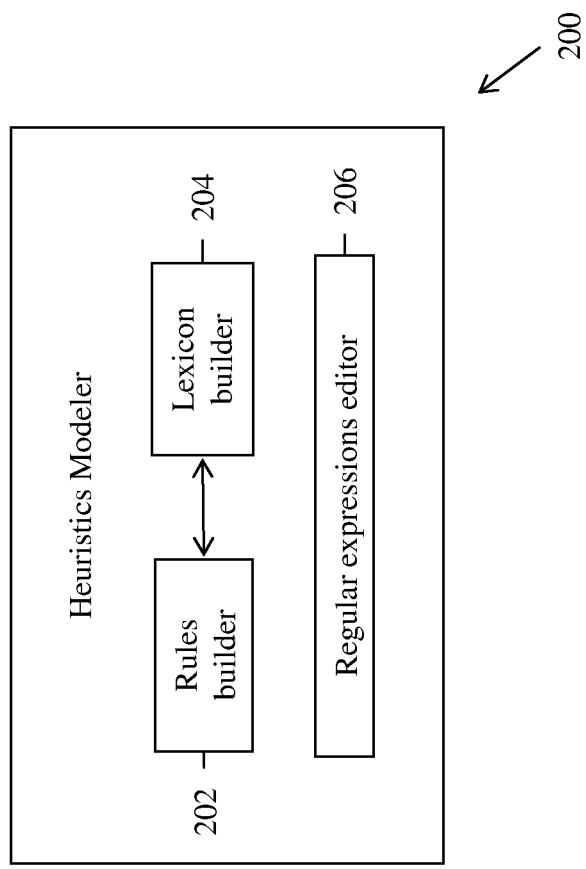
FIG. 2 illustrates a block diagram of a heuristics modeler.

FIG. 2 illustrates a block diagram of a heuristic modeler 200. Heuristic modeler 200 comprises a rules builder 202, a lexicon builder 204, and a regular expressions editor 206.

Rules builder 202 is a GUI-based module that facilitates application developers to build linguistic rules using one or more rule templates. The rule templates are predefined forms designed for formulating a variety of rules. In an embodiment of the present invention, each rule template comprises one or more rule parameters for defining one or more rules. In another embodiment of the present invention, an application developer may define a rule by selecting a rule template and specifying one or more rule parameters. In yet another embodiment of the present invention, an application developer may customize a rule by modifying parameters of an already existing rule. In yet another embodiment of the present invention, an application developer may check the results of rules in real-time and perform trial and error to define rules. In yet another embodiment of the present invention, when a rule cannot be build using existing rule templates, then a new rule template may be developed for building the rule. In yet another embodiment of the present invention, the newly developed rule template may be added to a source repository of the rule templates.

Lexicon builder 204 is a GUI-based module used by application developers to manage and build lexicon files for a rule-based named entity extraction system. A lexicon file is a look-up table that includes a list of commonly occurring domain specific terms and phrases. In an embodiment of the present invention, the lexicon file is a text file containing a list of terms or phrases separated by a new line. In another embodiment of the present invention, one or more terms can be added/removed from a lexicon file. Further, it can be checked whether a new term is present in a lexicon file before adding the new term to the lexicon file. In yet another embodiment of the present invention, a new lexicon file may be built or existing lexicon file may be edited using lexicon builder 204.

Regular expressions editor 206 facilitates an application developer to formulate rules in form of regular expressions without using GUI wizards. In an embodiment of the present invention, a rule in the form of a regular expression can be formulated. A regular expression is a computing expression used for identifying string patterns in text data. Regular expressions editor 206 enables a user to directly enter a general expression for text extraction rather than modeling it using a GUI. An example of necessity of use of regular expressions editor 206 may be an instance where a complex rule has to be formulated which cannot be done using a predefined form in the rules builder 202. In an embodiment of the present invention, regular expressions editor 206 facilitates formulating one or more linguistic rules in the form of string pattern matching expressions.

Figure 3:
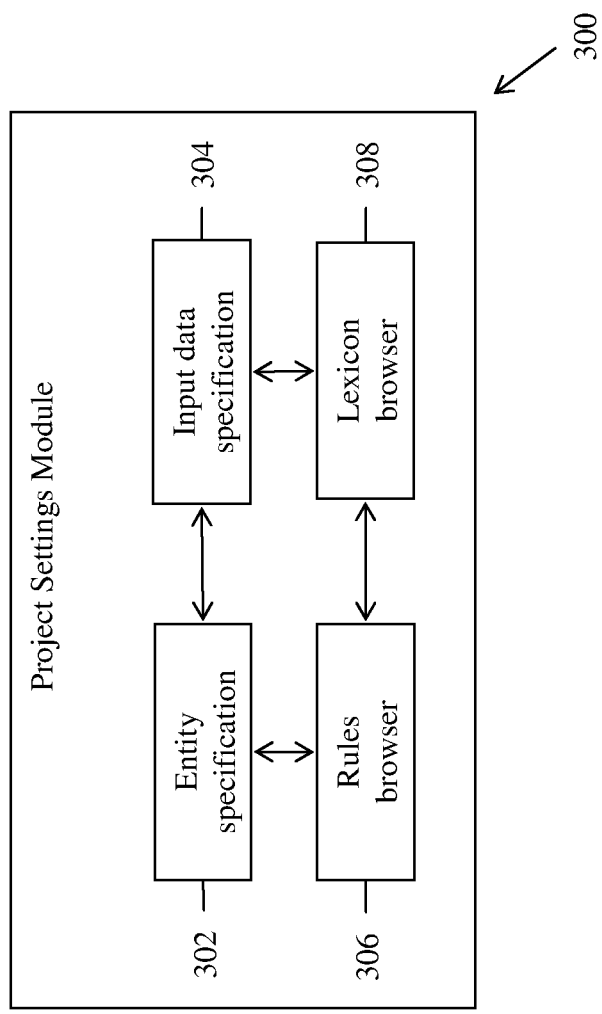
FIG. 3 illustrates a block diagram of a project settings module.

FIG. 3 illustrates a project settings module 300. Project settings module 300 includes an entity specification module 302, an input data specification module 304, a rules browser 306, and a lexicon browser 308.

Entity specification module 302 is a GUI based tool that facilitates application developers to specify one or more entity types relevant to technical domain of the rule-based named entity extraction system. Examples of entity types include, but are not limited to, person names, products, organization, location, email addresses, vehicle, computer parts, currency, temporal entities such as dates, time, day, year, month, and week and numerical entities such as measurements, percentages, and monetary values. In an embodiment of the present invention, the entity specification module 302 may be used for building one or more lexicon files of entity types.

Input data specification module 304 is a GUI based tool that facilitates application developers to specify format of input data on which the rule-based named entity extraction system may be executed. In an embodiment of the present invention, the input data may be a text file, an XML file, or an MS Excel file. In another embodiment of the present invention, each line within the text file may be considered as a record during named entity extraction. In yet another embodiment of the present invention, the input data may be saved in a source repository such as file system or RDBMS.

Rules browser 306 is a GUI-based tool that facilitates application developers to browse one or more existing rule templates stored in the source code repository. In an embodiment of the present invention, rules browser 306 displays a list of rule templates and facilitates an application developer to browse rule templates based on rule name and parameters.

Lexicon browser 308 is a Graphical User Interface (GUI) that facilitates application developers to create, modify, manage, and reuse one or more lexicon files. The lexicon browser 308 operates in communication with the lexicon builder 204 (FIG. 2) for building and managing lexicon files.

Figure 4:
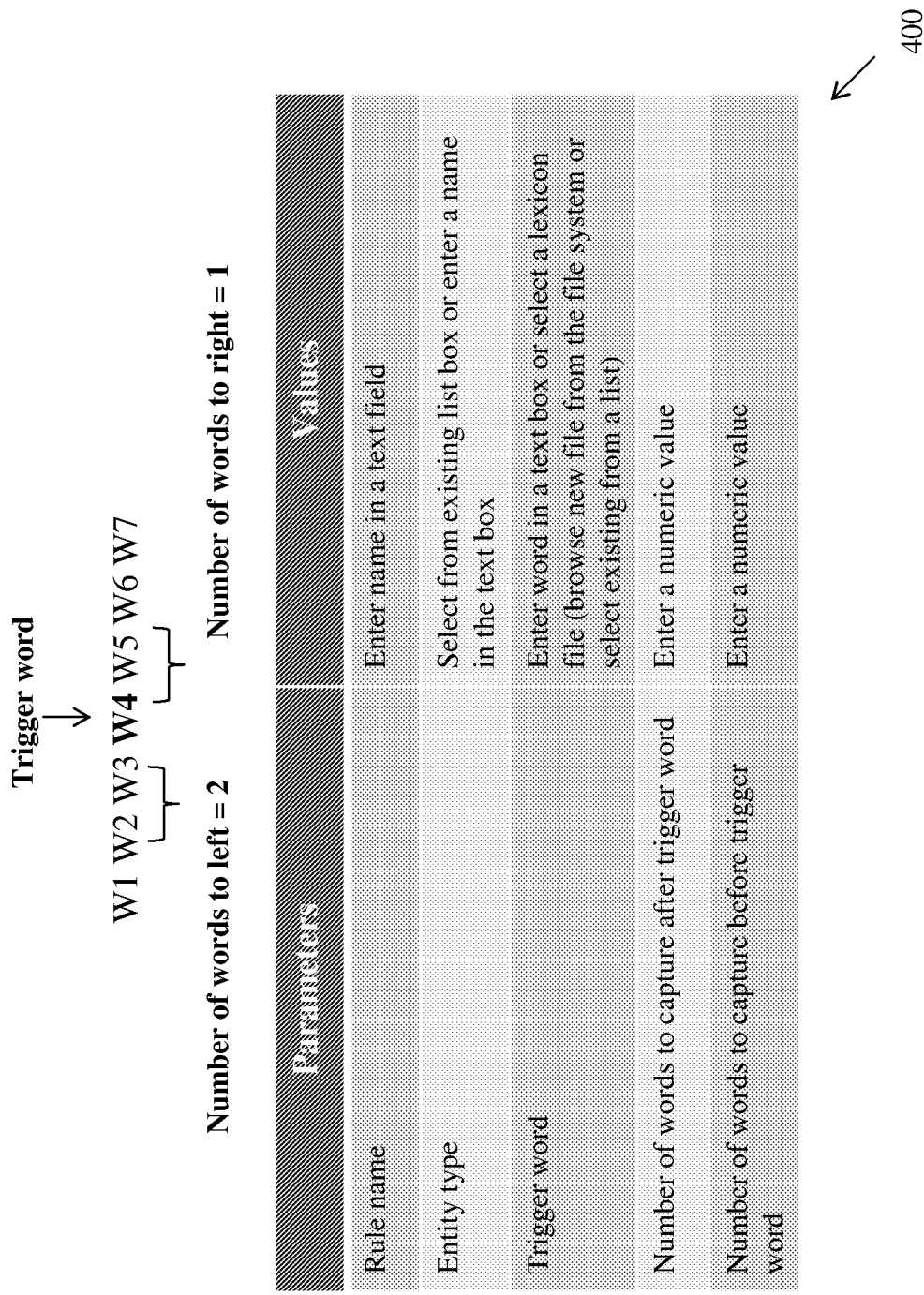
FIG. 4 illustrates a block diagram of a first rule template.

FIG. 4 illustrates a first rule template 400 for building a first rule of a rule-based named entity extraction system. In various embodiments of the present invention, the first rule may be referred to as "Trigger Word +\−N". The first rule states that entity to be extracted from unstructured text data is equal to trigger word(s) along with certain number of words (+/−N) to its left and right. The first rule template 400 comprises one or more rule parameters for building the first rule. The rule parameters may include, but are not limited to, rule name, entity type, trigger word, and number of words to extract before/after the trigger word.

In an embodiment of the present invention, the trigger word, entity type, and the number of words (+/−N) for the first rule may be specified in text fields of the first rule template 400. In another embodiment of the present invention, one or more lexicon files may be uploaded that contain a list of trigger words and entity types. In yet another embodiment of the present invention, new lexicon files of trigger words and entities may be created and stored in the source code repository.

In an exemplary embodiment of the present invention, a rule may be built using the first rule template 400 for extracting locations such as Wall Street, MG Road, Hudson Street, and Orchid Road from unstructured input text data. The rule may be defined as: "location" is equal to word "street" or "road" preceded by one more word. In the first rule template 400, the entity type may be specified as "location" and trigger words as "street" and "road". Further, the value for "number of words to left" may be set as one and "number of words to right" may be set as zero. In an embodiment of the present invention, an XML file may be automatically generated and stored in a source code repository when a rule is defined using the first rule template 400.

In another exemplary embodiment of the present invention, the first rule template 400 may be used to build a rule for extracting entities from unstructured text data of automotive warranty claim forms. Few examples of unstructured text data present in warranty claim forms are illustrated below:

Vehicle not starting
Horn not working
Cable not align

Each of the above-mentioned phrases includes two types of entities 'part' and 'defect'. The entities of type 'part' are:

"Vehicle, Horn, and Cable" and entities of type 'defect' are: "not starting, not working and not aligned". In an embodiment of the present invention, the rule for extracting 'defect' may be defined as: "defect" is equal to word "not" followed by one more word. In the first rule template 400, the entity type may be specified as "defect" and trigger word as "not". Further, the value for "number of words to left" may be set as zero and "number of words" to right may be set as one.

Figure 5:
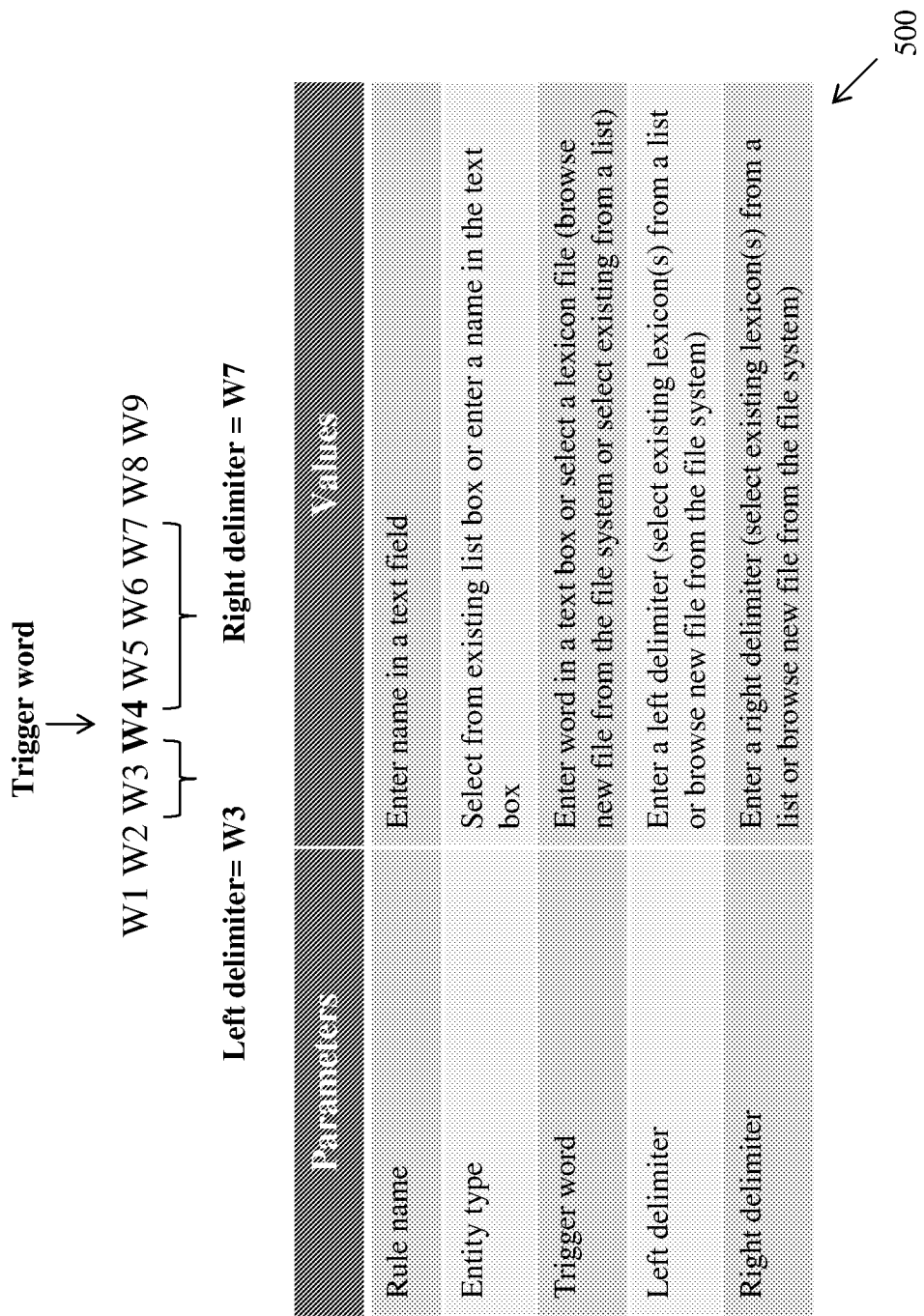
FIG. 5 illustrates a block diagram of a second rule template.

FIG. 5 illustrates a second rule template 500 for building a second rule of a rule-based named entity extraction system. In various embodiments of the present invention, the second rule may be referred to as "Trigger word+/−Lexicon delimiter". The second rule states that the entity to be extracted from unstructured text data is equal to trigger word(s) along with words delimited by its left and right delimiter. The second rule template 500 comprises one or more rule parameters for building the second rule. The rule parameters include, but are not limited to, rule name, entity type, trigger word, left delimiter, and right delimiter.

In an embodiment of the present invention, the trigger word(s), entity type(s), left and right delimiters for the second rule may be specified in text fields of the second rule template 500. In another embodiment of the present invention, one or more lexicon files may be uploaded having a list of trigger word(s), entity type(s), left, and right delimiters. In another embodiment of the present invention, new lexicon files of trigger word(s), entity type(s), left and right delimiters may be created and stored in the source code repository.

In an exemplary embodiment of the present invention, a rule may be built using the second rule template 500 for extracting locations such as 'House No. 2, Wall Street, US'; 'House No. 4, MG Road, United States'; and 'House no. 7, Hudson Street, Orchid Road, United States'. The rule may be defined as: "location" is equal to word "street" or "road" delimited by word "house" at left and delimited by word "United States or US" at right. In the second rule template 500, the entity type may be specified as "location" and trigger words as "street" and "road". Further, the left delimiter may be set as "house" and right delimiter may be set as "United States or US". In an embodiment of the present invention, an XML file may be automatically generated and stored in a source code repository when a rule is defined using the second rule template 500.

In various embodiments of the present invention, the rule-based named entity extraction system of the present invention functions based on rules formulated using domain specific language patterns and does not utilize the knowledge of grammar of unstructured text data. The unstructured text data may be grammatically incorrect due to incorrect spelling, incorrect grammar, usage of domain specific jargons, and shorthand writing. As a result, the rule-based named entity extraction system of the present invention is particularly useful in extracting named entities where the input text data is grammatically incorrect.

Figure 6:
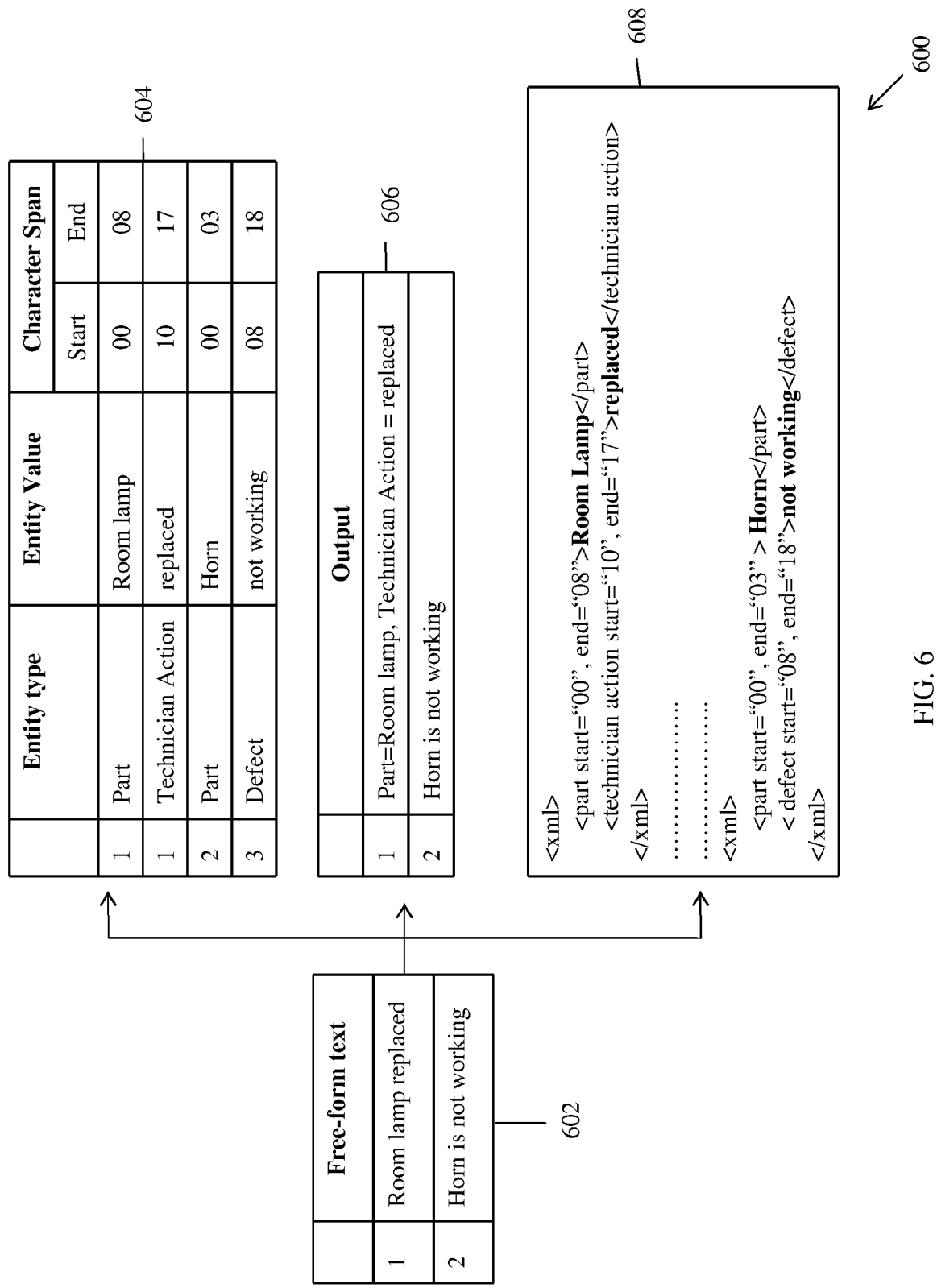
FIG. 6 illustrates entity extraction results of a rule-based named entity extraction system developed using RAD framework.

FIG. 6 illustrates entity extraction results 600 of a rule-based named entity extraction system developed using RAD framework 100 (FIG. 1). The input to the rule-based named entity extraction system is input text 602 and output is represented in first output format 604, second output format 606, and third output format 608. In an exemplary embodiment of the present invention, the input text 602 is unstructured text obtained from warranty claim forms of automotive warranty claim division. The input text 602 comprises two input records as 'room lamp replaced' and 'horn not working' and they comprise entities of type 'vehicle part', 'defect' and 'technician action'. In an embodiment of the present invention, the entities of type 'part' are 'vehicle' and 'horn'. In another embodiment of the present invention, the entity of type 'defect' is 'not working'. In yet another embodiment of the present invention, the entity of type 'technician action' is 'replaced'.

The first output format 604 represents extracted entities of the input records in a tabular format. The start and end character span represents the character offset of the entity value from the beginning of input records. The second output format 606 represents extracted entities of similar input records. The third output format 608 represents a structured XML document containing the extracted entity types and values.

In various embodiments of the present invention, named entity extraction of input text 602 may be facilitated by one or more domain specific lexicon files. In an exemplary embodiment of the present invention, named entity extraction of input text 602 may be facilitated by developing a lexicon file of 'vehicle parts' such as "room lamp, horn, AC, cable, motor, actuators, and door", a lexicon file of 'technician actions' such as "replaced, removed, corrected, and aligned" and a lexicon file of 'defects' such as "rusty, broken, jammed, not starting, not working, not aligned".

Figure 7:
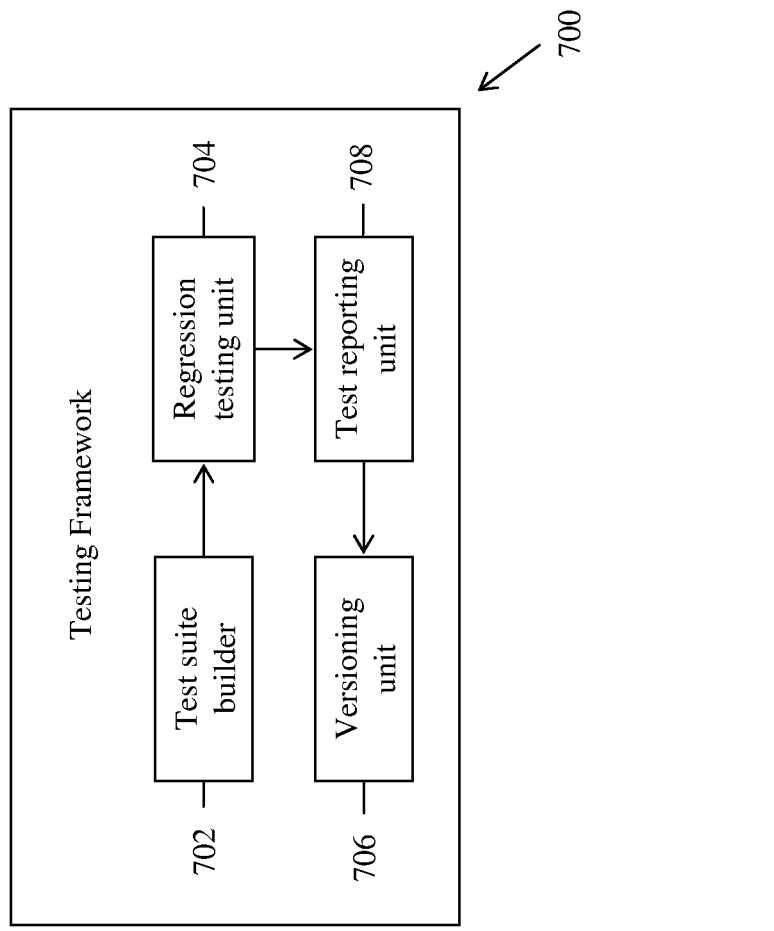
FIG. 7 illustrates a block diagram of a testing framework for conducting regression testing.

FIG. 7 illustrates a block diagram of a testing framework 700 for conducting regression testing of a rule-based named entity extraction system. Testing framework 700 includes a test suite builder 702, a regression testing unit 704, a test reporting unit 708, and a versioning unit 706.

Test suite builder 702 is a GUI-based tool that facilitates building of one or more test suites for conducting regression testing of a rule-based named entity extraction system. A test suite is a collection of one or more similar test cases, where a test case is a set of conditions or variables under which an application developer determines whether an application meets specifications. In an embodiment of the present invention, extraction results obtained by executing the rule-based named entity extraction system on input texts may be saved in form of one or more test cases in a file system or RDBMS.

Regression testing unit 704 is a GUI-based tool that facilitates application developers to conduct regression testing of a rule-based named entity extraction system whenever its source code is modified. In an embodiment of the present invention, the entity extraction result obtained by executing modified source code on input text is referred to as predicted output, and the entity extraction result obtained by executing the original source code on the input text is referred to as expected output. In another embodiment of the present invention, the expected and predicted outputs of a source code are stored as test cases in a file system or a RDBMS. In yet another embodiment of the present invention, the expected and predicted outputs for similar input text are compared to facilitate regression testing of the modified source code.

Test reporting unit 708 is a GUI-based tool that facilitates generation of regression testing results in the form of reports. In various embodiments of the present invention, reports include information about accuracy, recall, F-score, execution time, number of correct results, number of partially correct results, number of incorrect results, statistics for each entity, error line number and type, summary report generation and comprehensive list of incorrect results. In various embodiments of the present invention, recall and F-score are performance measures associated with information retrieval. Recall for a search and classification system is defined as the ratio of the number of correct results in the search or classification result and the total number of relevant results in the input collection. Recall is a measure of how well a search or classification engine performs in retrieving or classifying relevant documents or results. Precision is defined as the ratio of the number of relevant results retrieved by a search and the total number of results retrieved by the information retrieval or classification system. F-score or F-measure combines Precision and Recall and is calculated as the weighted harmonic mean of precision and recall.

Versioning unit 706 is a GUI based tool that facilitates versioning of rule-based named entity extraction system based on reports generated by test reporting unit 708. In an embodiment of the present invention, a rule-based named entity extraction system may be assigned a version number based on regression test results and modifications to the source code.

Operationally, test suite builder 702 facilitates an application developer to create test cases for conducting regression testing of a rule-based named entity extraction system. The regression testing unit 704 conducts regression testing of the rule-based named entity extraction system by executing the test cases built using test suite builder 702. The test reporting unit 708 generates reports based on output of regression testing results of the rule-based named entity extraction system. Based on the reports generated by test reporting unit 708, test versioning unit 706 may assign a version to the rule-based named entity extraction system.

Figure 8:
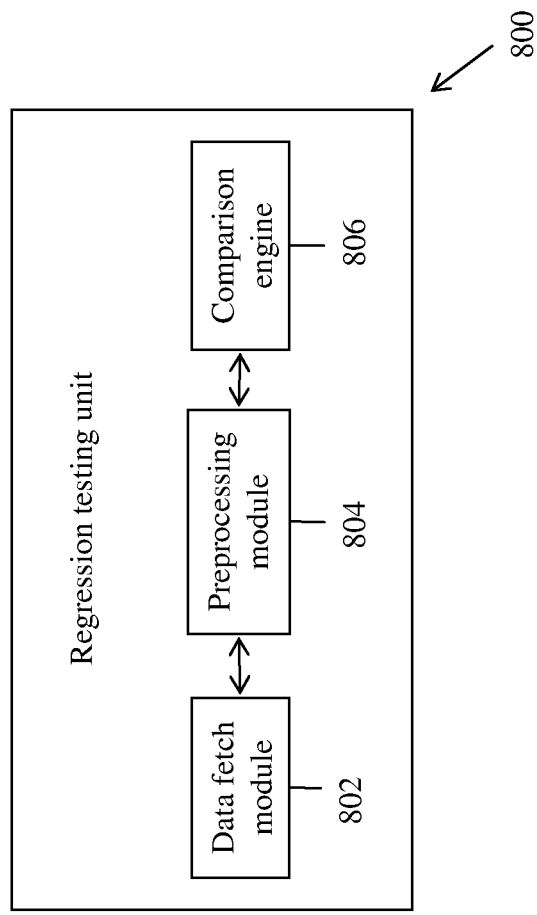
FIG. 8 illustrates a block diagram of a regression testing unit.

FIG. 8 illustrates a block diagram of a regression testing unit 800. The regression testing unit 800 comprises a data fetch module 802, a preprocessing module 804, and a comparison engine 806.

The data fetch module 802 fetches the expected and predicted outputs of a rule-based named entity extraction system from a data source such as a file system and RDBMS. In an embodiment of the present invention, the data fetch module 802 may include data source adapters and connectors for fetching data from the data source.

The preprocessing module 804 converts the formats of predicted and expected outputs into an intermediate format. In an embodiment of the present invention, the intermediate format may be a pre-defined standard format of the RAD framework 100 (FIG. 1).

Operationally, when an application developer initiates regression testing of a modified source code of a rule-based named entity extraction system, the data fetch module 802 fetches the expected and predicted outputs of the system from the data source. When the expected and predicted outputs are fetched, the preprocessing module 804 converts them into an intermediate standard format. The outputs in standard format are compared by the comparison engine 806 to verify the functionality of modified source code.

Figure 9:
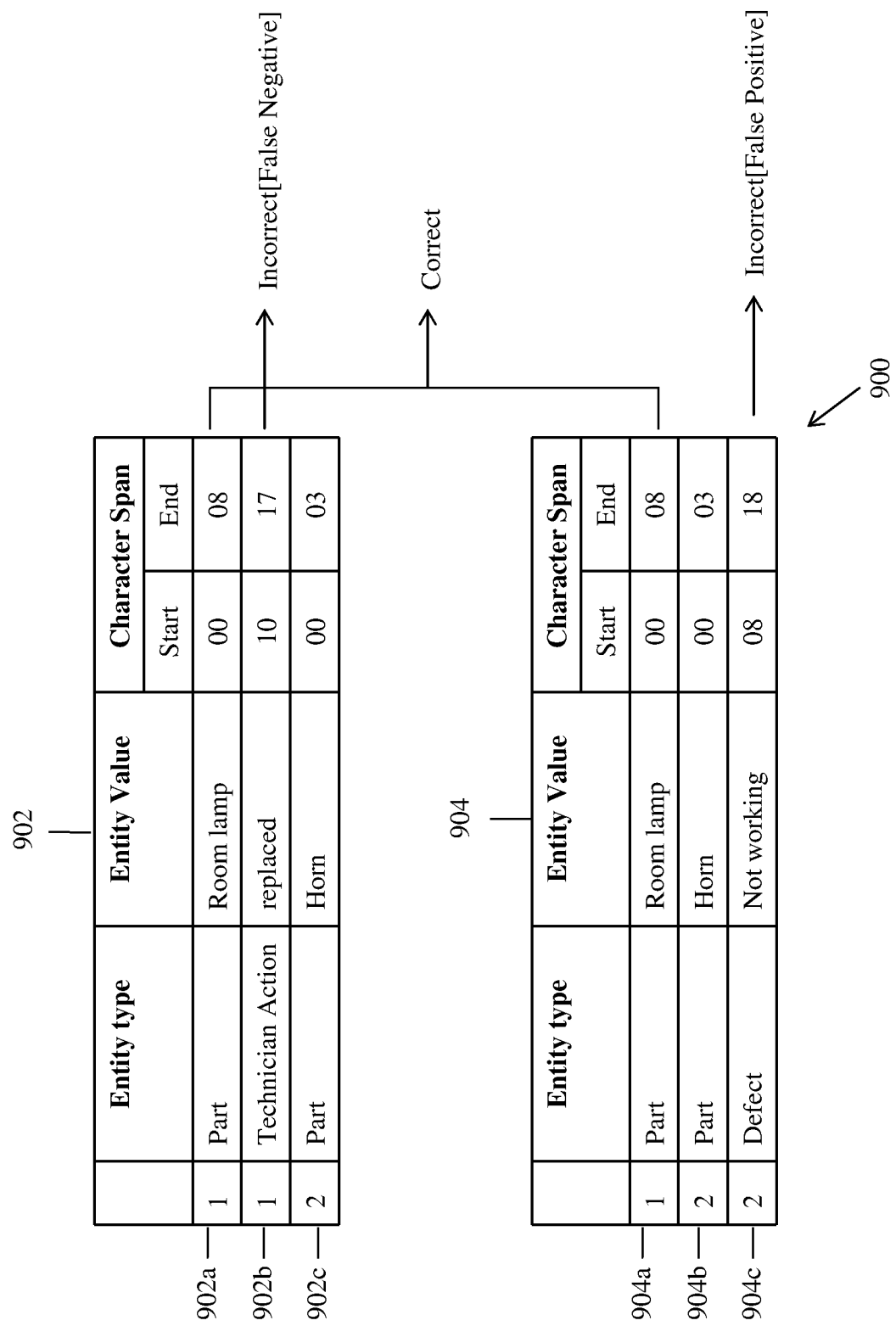
FIG. 9 illustrates regression testing results of a rule-based named entity extraction system.

FIG. 9 illustrates regression testing results of a rule-based named entity extraction system 900. The regression testing results illustrate comparison results of expected output 902 and predicted output 904. In an embodiment of the present invention, the input text for obtaining expected output 902 and predicted output 904 is input text 602 (FIG. 6). In another embodiment of the present invention, each of the expected output 902 and predicted output 904 comprise three entries. The expected output 902 comprises first entry 902*a*, second entry 902*b*, and third entry 902*c*. The predicted output 904 comprises first entry 904*a*, second entry 904*b*, and third entry 904*c*.

In various embodiments of the present invention, the record number, entity type, entity value, start character span and end character span of the first entries 902*a* and 904*a* match completely. Further, the entity type, entity value, start character span and end character span of third entry 902*c* and second entry 904*b* match completely. Therefore, the first entry 902*a* and third entry 902*c* of the expected output 902 are marked as correct. In an embodiment of the present invention, the second entry 902*b* of the expected output 902 is marked as false negative as is present in the expected output 902 but absent in the predicted output 904. In another embodiment of the present invention, the third entry 904*c* is marked as false positive as it is present in the predicted output 904 but absent in the expected output 902. In yet another embodiment of the present invention, the entries marked with false positive and false negative are considered incorrect.

FIG. 10 is a sample accuracy report 1000 illustrating regression testing results of a rule-based named entity extraction system for one or more input text files. The sample accuracy report 1000 includes an overall accuracy report 1002 and an entity level accuracy report 1004. The overall accuracy report 1002 illustrates regression testing results of 200 records. In an embodiment of the present invention, each line within an input text file may be considered as a record. In another embodiment of the present invention, 200 records of both the expected and predicted output are compared for obtaining regression testing results. Out of 200 records, 150 are marked as correct, 30 are marked as partially correct and 20 are marked as failed.

The entity level accuracy report 1004 illustrates regression test results for entity types 'part' and 'defect' of 200 records. In an embodiment of the present invention, extraction of entity type 'part' resulted in success for 95 times and resulted in failure for 5 times. In another embodiment of the present invention, extraction of entity type 'defect' resulted in success for 25 times and resulted in failure for 25 times.

Figure 11:
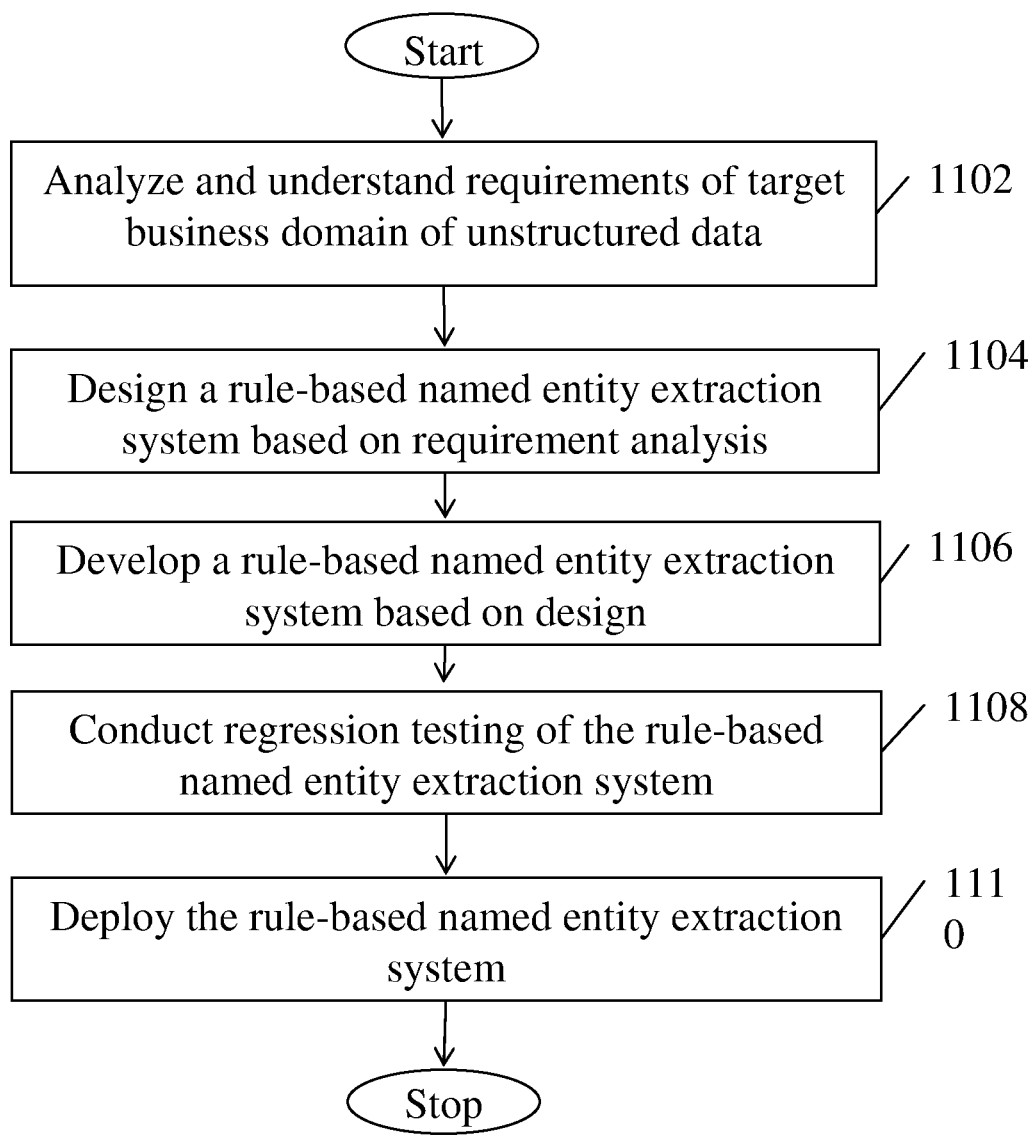
FIG. 11 is a flowchart illustrating a method of developing a rule-based named entity extraction system.

FIG. 11 is a flowchart illustrating a method of developing a rule-based named entity extraction system. In various embodiments of the present invention, the rule-based named entity extraction system may be developed to facilitate business users of one or more business domains to extract named entities from unstructured text data of the target business domain.

At step 1102, the requirements of business users are analyzed. The process of analyzing the requirements comprises understanding the business problem and studying domain specific language patterns. In an exemplary embodiment of the present invention, the business domain of the business users may be automotive warranty claim analysis division. The business problem may be extraction of entities of type 'vehicle parts' and 'vehicle defects' from unstructured text data of automotive warranty claim forms.

At step 1104, a rule-based named entity extraction system is designed based on the requirement analysis. In various embodiments of the present invention, the rule-based named entity extraction system is designed whenever the requirements of business users are updated. The process of designing comprises defining project parameters, rules, lexicons and entities based on study of language patterns of unstructured text data of the target business domain.

At step 1106, the design of the rule-based named entity extraction system is implemented using one or more GUI-based tools of a RAD framework. In various embodiments of the present invention, the rule-based named entity extraction system is implemented whenever its design is updated. The process of implementing the design of the rule-based named entity extraction system comprises specifying project settings, building entities, building rules and lexicons. In an embodiment of the present invention, specifying project settings comprise specifying project name and working directory. In another embodiment of the present invention, the entities, rules and lexicons are built using one or more GUI-based tools. In yet another embodiment of the present invention, source code corresponding to rules and lexicons build using GUI tools is automatically generated and stored in a source code repository. In yet another embodiment of the present invention, the source code is saved in form of a XML file in a file system or Relational Database Management System (RDBMS) of the RAD framework.

At step 1108, regression testing of the rule-based named entity extraction system is conducted to verify the functionality of its source code. In various embodiments of the present invention, the regression testing is conducted whenever source code of the rule-based named entity extraction system is modified. The regression testing comprises structuring tests, creating test cases, executing test cases and generating test reports. In an embodiment of the present invention, the test cases are created by storing expected and predicted outputs of a rule-based named entity extraction system for similar input texts in a source repository. In another embodiment of the present invention, the test cases are executed to compare the expected and predicted outputs of the rule-based named entity extraction system. In yet another embodiment of the present invention, the test reports are generated based on execution results of the test cases.

At step 1110, the rule-based named entity extraction system is deployed. In various embodiments of the present invention, the rule-based named entity extraction system is deployed whenever it qualifies the regression tests. The process of deploying the rule-based named entity extraction system comprises versioning, documentation, archiving and creating run-time artifacts. In an embodiment of the present invention, the process of versioning comprises assigning a version to the entity extraction system based on regression testing results.

Figure 12:
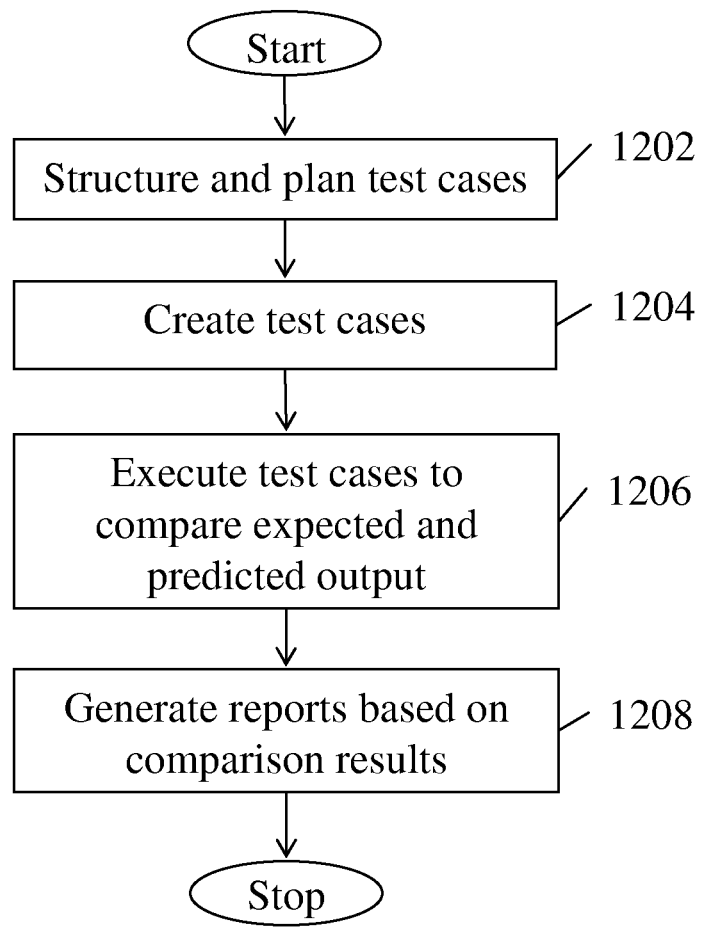
FIG. 12 is a flowchart illustrating a method of conducting regression testing of a rule-based named entity extraction system.

FIG. 12 is a flowchart illustrating a method of conducting regression testing of a rule-based named entity extraction system. In various embodiments of the present invention, regression testing is conducted in order to verify source code of the rule-based named entity extraction system whenever the source code is modified.

At step 1202, test cases for conducting the regression testing are planned and structured. At step 1204, test cases are created. In various embodiments of the present invention, the test cases are created using user-interfaces and engines to build test cases.

At step 1206, the test cases are executed to compare expected and predicted outputs. Thereafter, at step 1208, reports are generated based on the comparison results. In various embodiments of the present invention, reports include information about accuracy, recall, F-score, execution time, number of correct results, number of partially correct results, number of incorrect results, statistics for each entity, error line number and type, summary report generation, and comprehensive list of incorrect results.

FIG. 13 illustrates a rules browser graphical user interface (GUI) screen 1300. The rules browser GUI screen 1300 illustrates a display associated with the rules browser 306 (FIG. 3). Rules browser 306, in turn, is part of the RAD framework 100 (FIG. 1). The rules browser GUI screen 1300 displays a list of rule icons corresponding to rule templates. The rule templates may be stored in a source repository of rule templates. In various embodiments of the present invention, a user can select an appropriate rule icon from the displayed list of rule icons that meets his requirement. FIG. 13 displays three rule icons available for selection by the user. In an embodiment of the present invention, the user may browse rule icons 1302 and rule parameters 1304. The rule parameters 1304 include rule name and input parameters. The user may select a rule icon which addresses his needs. In an exemplary embodiment, upon selection of a rule icon, a rule template corresponding to the rule icon is extracted from the source repository of rule templates. The user populates the extracted rule template by specifying values of input parameters in the rule template. Building of rules by specifying values of parameters is described in conjunction with the description of FIGS. 4 and 5. In an embodiment of the present invention, upon building of a rule, an application code and XML file corresponding to the rule is generated by the RAD framework 100 (FIG. 1) at run-time.

Figure 14:
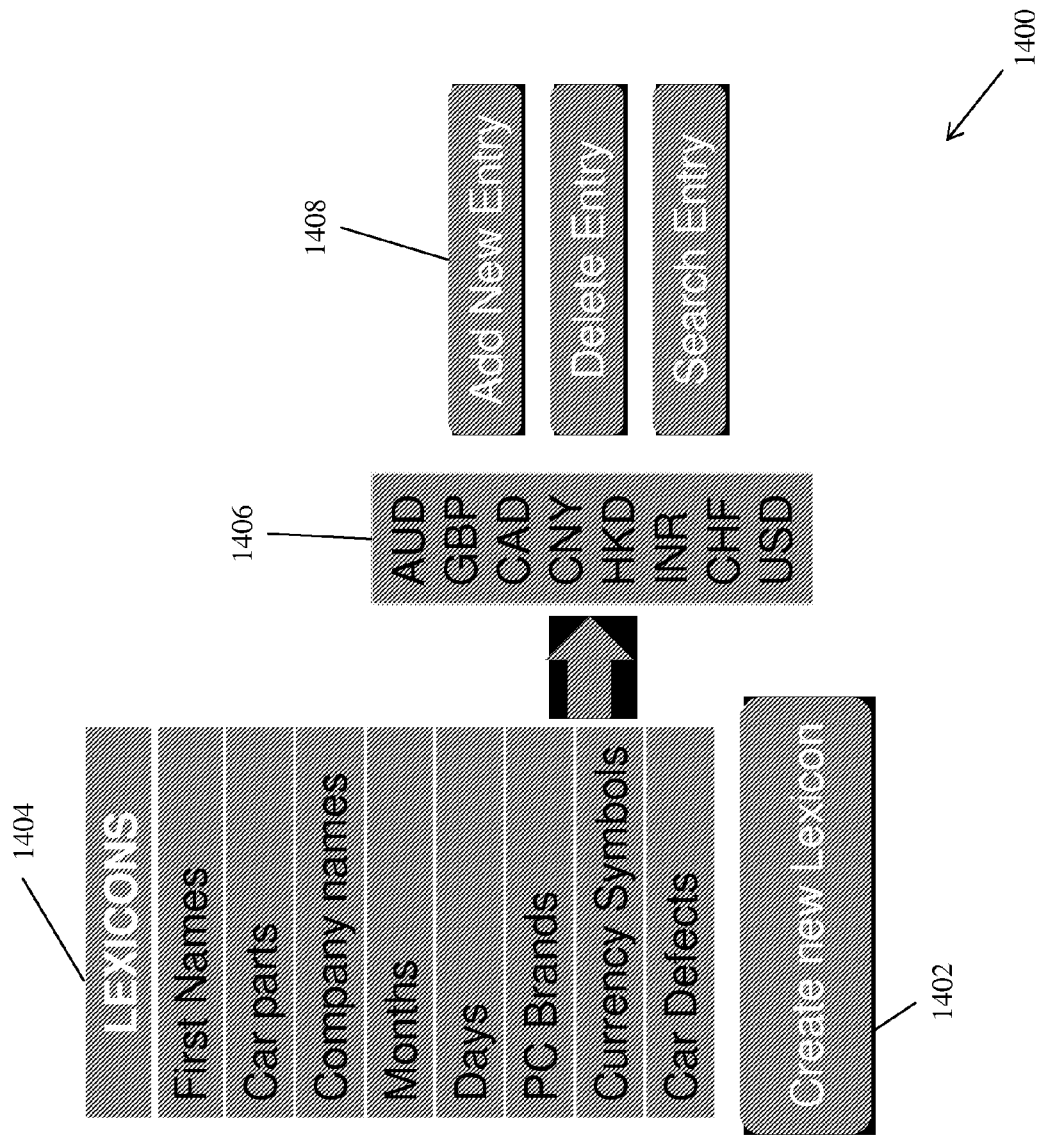
FIG. 14 illustrates a lexicon browser GUI screen.

FIG. 14 illustrates a lexicon browser GUI screen 1400 associated with the lexicon browser 308 (FIG. 3). As shown in the figure, a user can create a new lexicon from scratch by using the clickable tab "Create new Lexicon" 1402. In an embodiment of the present invention, the user can also use or modify any of the existing lexicons. The list of existing lexicons 1404 in the lexicon repository, as shown in the FIG. 14 are "First Names", "Car Parts", "Company Names", "Months", "Days", "PC Brands", "Currency Symbols", "Car Defects". FIG. 14 shows a scenario wherein a user has selected the "Currency Symbols" lexicon. The contents of the "Currency Symbols" lexicon are as shown in a list 1406. The contents include the currency symbols of multiple countries. In various embodiments of the present invention, the user can browse the lexicon, sort the lexicon, create new entries, delete existing entries, and search for entries. By accessing the features of the lexicon browser GUI screen 1400, a user can efficiently organize and manage large datasets of lexicons.

While the exemplary embodiments of the present invention are described and illustrated herein, it will be appreciated that they are merely illustrative. It will be understood by those skilled in the art that various changes in form and detail may be made therein without departing from or offending the spirit and scope of the invention as defined by the appended claims.

We claim:

1. A computer program product comprising a non-transitory computer usable medium having a computer readable program code embodied therein for developing a rule-based named entity extraction system, the computer program product comprising program instructions configured to implement:

a heuristics modeler configured to:
present a user with a plurality of predefined template rule parameters, wherein one or more of the predefined template rule parameters are defined based on domain specific language patterns;
receive user input selecting at least one rule parameter from among the predefined template rule parameters;
define at least one linguistic rule based on based on the at least rule parameter selected by the received user input, wherein the at least one linguistic rule enables automated extraction of named entities from unstructured text data;

a testing framework configured to enable automated regression testing of the named entity extraction system;

a project settings module configured to perform project management activities for implementing the named entity extraction system; and a deployment module configured to facilitate deployment of the rule-based named entity extraction system using software components.

2. The computer program product of claim 1, wherein the heuristics modeler comprises:

a rules builder configured to provide users with a graphical user interface for building linguistic rules, wherein the graphical user interface displays one or more rule templates for defining rules;

a lexicon builder configured to provide the user with a graphical user interface for building and managing lexicon files; and a regular expressions editor configured to provide the user with an interface or formulating rules by entering regular expressions.

3. The computer program product of claim 2, wherein the project settings module comprises:
- an entity specification module configured to provide users with means to specify one or more entity types relevant to technical domain of the rule-based named entity extraction system;
- an input data specification module configured to facilitate users to specify format of input data on which the rule-based named entity extraction system is executed;
- a rules browser configured to facilitate users to browse one or more existing rule templates stored in a source code repository, wherein the rules browser operates in communication with the rules builder for building of rules and lexicons; and
- a lexicon browser configured to facilitate users to create, modify, manage and reuse one or more lexicon files, wherein the lexicon browser operates in communication with the lexicon builder for building and managing lexicon files.

4. The computer program product of claim 1, wherein the testing framework comprises:
- a test suite builder configured to facilitate building of one or more test suites for conducting regression testing of the rule-based named entity extraction system;
- a regression testing unit configured to conduct regression testing of the rule-based named entity extraction system, wherein the regression testing is done to verify functionality of source code modified as a result of a change in rule definition;
- a test reporting unit configured to facilitate generation of regression testing results in the form of reports; and
- a versioning unit configured to facilitate versioning of the rule-based named entity extraction system.

5. The computer program product of claim 4, wherein the regression testing unit comprises:
- a data fetch module configured to fetch expected output and predicted output of the rule-based named entity extraction system,
  - wherein expected output comprises a named entity extraction result obtained by executing source code unmodified by change in named entity extraction rule definition, and
  - wherein predicted output comprises a named entity extraction result obtained by executing source code modified by change in named entity extraction rule definition,
- a preprocessing module configured to convert the formats of predicted and expected outputs into an intermediate format; and
- a comparison engine configured to compare the expected and predicted outputs in order to verify functionality of source code modified as a result of a change in rule definition.

6. A method for developing a rule-based named entity extraction system, the method comprising:
- presenting through a graphical user interface (GUI) a plurality of predefined template rule parameters, wherein one or more of the predefined template rule parameters are defined based on domain specific language patterns;
- receiving through the GUI, user input selecting at least one rule parameter from among the predefined template rule parameters;
- designing the rule-based named entity extraction system, wherein designing the rule-based named entity extraction system comprises defining at least one linguistic rule based on the at least rule parameter selected by the received user input, wherein the at least one linguistic rule enables automated extraction of named entities from unstructured text data;
- implementing the design of rule-based named entity extraction system using one or more GUI-based tools;
- conducting regression testing of the rule-based named entity extraction system, wherein the regression testing is conducted to verify functionality of source code; and
- deploying the rule-based named entity extraction system.

7. The method of claim 6, wherein designing the rule-based named entity extraction system additionally comprises defining one or more of project parameters, rules, lexicons and entities based on the domain specific language patterns.

8. The method of claim 6, wherein implementing the design of rule-based named entity extraction system comprises:
- specifying project settings;
- building one or more entities; and
- building one or more linguistic rules and lexicons.

9. The method of claim 8, wherein specifying project settings comprises specifying project name and working directory.

10. The method of claim 8, wherein the one or more entities, the one or more linguistic rules and lexicons are built using one or more GUI-based tools.

11. The method of claim 8, wherein source code corresponding to the one or more entities and the one or more rules and lexicons is automatically generated and stored in a source code repository.

12. The method of claim 8, wherein the source code is saved in form of an XML file in a file system or RDBMS system.

13. The method of claim 6, wherein conducting regression testing of the rule-based named entity extraction system comprises:
- structuring one or more tests;
- creating one or more test cases;
- executing the one or more test cases; and
- generating test reports corresponding to the one or more test cases.

14. The method of claim 13, wherein the one or more test cases are created by storing expected and predicted outputs of a rule-based named entity extraction system for similar input texts in a source repository,
- wherein expected output comprises a named entity extraction result obtained by executing source code unmodified by change in named entity extraction rule definition, and
- wherein predicted output comprises a named entity extraction result obtained by executing source code modified by change in named entity extraction rule definition.

15. The method of claim 13, wherein the one or more test cases are executed to compare the expected and predicted outputs of the rule-based named entity extraction system,
- wherein expected output comprises a named entity extraction result obtained by executing source code unmodified by change in named entity extraction rule definition, and
- wherein predicted output comprises a named entity extraction result obtained by executing source code modified by change in named entity extraction rule definition.

16. The method of claim 6, wherein deploying the rule-based named entity extraction system comprises:
- assigning a version to the entity extraction system based on regression testing results; and
- creating run-time artifacts.

* * * * *